E. S. COLTON.
Ice-Cream Freezer.
No. 69,971.                              Patented Oct. 22, 1867.
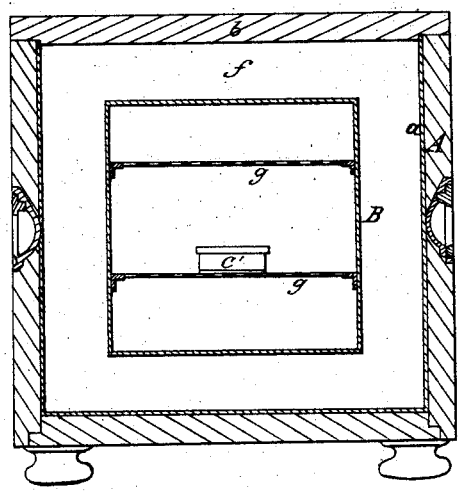
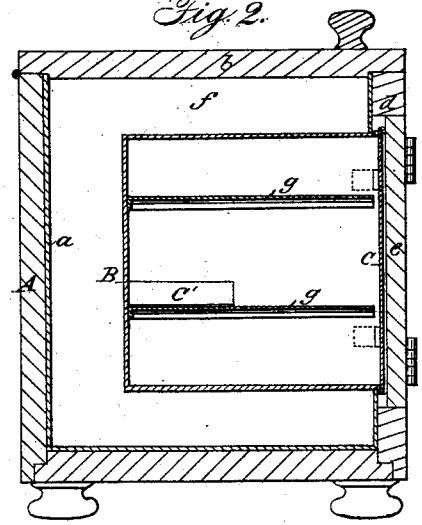
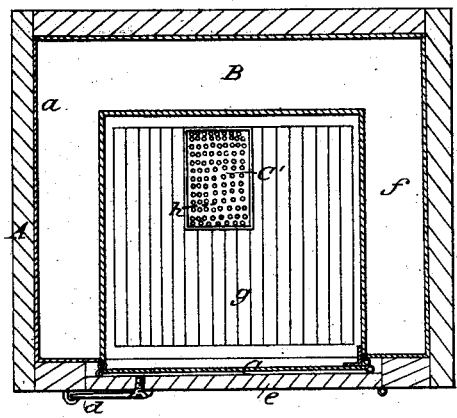
Witnesses:
S. N. Piper
Jas. H. Mullen
Inventor:
Edward S. Colton
Per R. H. Eddy, Atty

UNITED STATES PATENT OFFICE.

E. S. COLTON, OF BOSTON, MASSACHUSETTS.

IMPROVED ICE-CREAM REFRIGERATOR.

Specification forming part of Letters Patent No. 69,971, dated October 22, 1867.

*To all whom it may concern:*

Be it known that I, EDWARD S. COLTON, of Boston, in the county of Suffolk and State of Massachusetts, have invented a new and useful Cream-Refrigerator; and I do hereby declare the same to be fully described in the following specification and represented in the accompanying drawings, of which—

Figures 1 and 2 are vertical sections of it, taken in planes at right angles with each other. Fig. 3 is a horizontal section of it.

In such drawings, A denotes a box, lined with sheet metal, *a*, and being open at top, and there provided with a cover, *b*, which may be hinged to one side of the box.

Within the box A is a smaller box, B, made of sheet metal. The said box B is secured to one side of the metallic lining *a* of the box A, and opens through such, and has a door, C, to such opening.

In front of the opening is another or larger one, *d*, made through the side of the box A, this latter opening being provided with a door, *e*, hinged to the box.

Within the box A is a space, *f*, which surrounds the box B on its four sides and rear end, such space being to contain ice or other proper refrigerating material or materials.

The box D should have a series of shelves or gratings, *g g*, arranged within it to support a series of molds or trays, C', each of which consists of an open prismatic box having a foraminous bottom, *h*.

The ice-cream liquid to be frozen is usually made, or to be made, of such consistence that after being poured into the mold it will not flow through the minute holes of the bottom thereof. The object of the foraminous bottom is to prevent the prism or parallelopiped of cream from adhering by atmospheric pressure to the bottom of the box or mold during an attempt to remove the mass from the box or mold.

Were the bottom not foraminous it would be difficult to separate the frozen cream from the mold without first subjecting it to heat or to modes known to confectioners.

The molds may have other forms, but should be foraminous in those parts or surfaces to which the cream, when frozen, would be held by atmospheric pressure on an attempt being made to separate it from the mold. I have found such a mode of making an ice-cream mold—viz., foraminous in such parts to which the cream, when frozen, would adhere by atmospheric pressure—completely overcomes the difficulty attendant upon such adhesion.

The opening in the top of the box A is to enable such box to be readily supplied with ice, and such ice to be distributed around the box B. The openings in the sides of the boxes A and B, with their doors, are to enable the ice-cream molds to be inserted within and removed from the cooling-box B, as occasion may require. The box A at its bottom may be provided with a hole for the discharge of water.

I claim—

1. The ice-cream refrigerator made as described—that is to say, of the two boxes A B, the metallic lining *a*, the ice-receiving space *f*, and the three openings and their doors or covers *b* C *e*, arranged together, as specified and represented.

2. As an improvement in the molds or vessels for holding cream or liquids to be frozen by such refrigerator, the construction of such molds foraminous on those surfaces to which the cream, when frozen, would be liable to adhere by atmospheric pressure under circumstances as described.

EDWARD S. COLTON.

Witnesses:
 R. H. EDDY,
 SAMUEL N. PIPER.